(12) United States Patent
De Jong et al.

(10) Patent No.: US 10,823,991 B2
(45) Date of Patent: Nov. 3, 2020

(54) METHOD FOR ELECTRICALLY DRIVING A SWITCHABLE OPTICAL ELEMENT

(71) Applicant: MERCK PATENT GMBH, Darmstadt (DE)

(72) Inventors: Ties De Jong, En Utrecht (NL); Paul Verbunt, Gh Roermond (NL)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 16/498,972

(22) PCT Filed: Mar. 27, 2018

(86) PCT No.: PCT/EP2018/057711
§ 371 (c)(1),
(2) Date: Sep. 27, 2019

(87) PCT Pub. No.: WO2018/178043
PCT Pub. Date: Oct. 4, 2018

(65) Prior Publication Data
US 2020/0209664 A1    Jul. 2, 2020

(30) Foreign Application Priority Data

Mar. 29, 2017 (EP) ..................... 17163455

(51) Int. Cl.
*G02F 1/133* (2006.01)
*E06B 9/24* (2006.01)
*G02F 1/137* (2006.01)

(52) U.S. Cl.
CPC ............ *G02F 1/13306* (2013.01); *E06B 9/24* (2013.01); *G02F 1/137* (2013.01); *E06B 2009/2464* (2013.01); *G02F 2001/13706* (2013.01); *G02F 2001/13756* (2013.01)

(58) Field of Classification Search
CPC ................................................... G02F 1/13306
See application file for complete search history.

(56) References Cited

U.S. PATENT DOCUMENTS

| | | | |
|---|---|---|---|
| 6,674,504 B1 * | 1/2004 | Li | C09K 19/544 349/169 |
| 2003/0206147 A1 * | 11/2003 | Mi | G09G 3/3629 345/87 |
| 2005/0083564 A1 * | 4/2005 | Mallya | G02F 1/13718 359/238 |

(Continued)

OTHER PUBLICATIONS

R. Baetens et al.: "Properties, requirements and possibilities of smart windows for dynamic daylight and solar energy control in buildings: A state-of-the-art review", Solar Energy Materials & Solar Cells, vol. 94, 2010, pp. 87-105.

(Continued)

*Primary Examiner* — Sang V Nguyen
(74) *Attorney, Agent, or Firm* — Millen White Zelano & Branigan, PC; Brion P. Heaney (57) ABSTRACT

A method for electrically driving a switchable optical element is provided wherein the state of a liquid-crystalline medium is controlled by an applied electric field. The provided method comprises at least one of
a) switching from a scattering state to a clear state,
b) switching from a clear state to a scattering state,
c) holding a scattering state.

17 Claims, 6 Drawing Sheets

(56) References Cited

U.S. PATENT DOCUMENTS

2007/0008262 A1* 1/2007 Harada .................. G09G 3/36
 345/87
2008/0316395 A1 12/2008 Donal
2019/0144752 A1* 5/2019 Hannington .......... C09K 19/44
 349/122

OTHER PUBLICATIONS

International Search report PCT/EP2018/057711 dated Dec. 11, 2018 (pp. 1-3).

* cited by examiner

Fig. 1 (state of the art)

Fig. 2 (state of the art)

METHOD FOR ELECTRICALLY DRIVING A SWITCHABLE OPTICAL ELEMENT

The invention relates to a method for electrically driving a switchable optical element comprising at least one switching layer, wherein the switching layer comprises a liquid-crystalline medium having at least three states, the state of the liquid-crystalline medium being controlled by an applied electric field.

The review article by R. Baetens et al. "Properties, requirements and possibilities of smart windows for dynamic daylight and solar energy control in buildings: A state-of-the-art review", Solar Energy Materials & Solar Cells 94 (2010) pages 87-105 describes tintable smart windows. Smart windows can make use of several technologies for modulating the transmittance of light such as devices based on electrochromism, liquid crystal devices and electrophoretic or suspended-particle devices. Liquid crystal based devices employ a change in the orientation of liquid crystal molecules between two conductive electrodes by applying an electric field which results in a change of their transmittance. Commercially available smart windows using liquid crystals operate at voltages between 65 and 230 V AC and require constant power in the clear state resulting in a power consumption of 3.5 up to 15.5 W/m$^2$ in contrast to electrochromic windows where power only is necessary during switching.

WO 2009/141295 A1 discloses an optical device having a switchable layer, at least one alignment layer and a light guiding system which is in contact with a light-energy converting means. The switchable layer comprises a luminescent material. In one embodiment a liquid crystal is used as the switchable layer and the liquid crystal dissolves and aligns the luminescent material in a guest-host system. The luminescent material exhibits dichroism such that the luminescent material has a strong absorption along a first axis and in any other axis the absorption is lower. The optical properties of the optical device depend on the alignment of the luminescent material. The optical device is in a transmitting state if the absorption axis of the luminescent material is aligned perpendicular to the main extension of the plane of the switchable layer and the optical device is in an absorbing state if the absorption axis is aligned parallel to the main extension plane of the switchable layer. A further scattering state is an intermediate state with the absorption axis of the luminescent material arranged in an alternating or random fashion between the parallel and perpendicular alignment. For switching between the states a polyimide layer with electrodes is used as alignment layer and a first electrical signal brings the switchable layer in the transmitting state, the application of a second electrical signals brings the switchable layer in the absorption state and a third electrical signal brings the switchable layer in the scattering state.

WO 2016/173693 discloses a switching layer for use in a switching element. The switching element has a transparent state and a hazy state. In the transparent state visible light can pass through the switching element without scattering. In the hazy state scattering occurs so that a diffuse transmission of light occurs. The switching element comprises two electrodes and a liquid-crystalline medium arranged between the two electrodes. The liquid-crystalline medium may comprise nematically orientated molecules and an optional polymer fraction. By applying a voltage between the two switching planes the state of the liquid-crystalline medium can be controlled. Depending on the applied voltage the liquid-crystalline medium adopts a scattering state, wherein the liquid-crystalline medium is in a chiral nematic multidomain state, or a non-scattering state, wherein the liquid-crystalline medium is in a homeotropic state. The voltage for the non-scattering state is higher than the voltage for the scattering state. For switching into the non-scattering state a first voltage is applied and for switching into the scattering state a lower second voltage is applied. Further, a window element comprising such a switching element is disclosed. The window may adopt a hazy or privacy state and a clear haze-free state.

The switching element of WO 2016/173693 may for example be used in a smart window capable of switching between a transparent and an opaque state. In the transparent state light may pass through the smart window without scattering, the windows appearance is clear and haze-free. In the opaque state light transmitted through the window is scattered and the window appearance is hazy.

It is an object of the invention to provide an improved method for electrically driving such switchable optical element wherein the state of a liquid-crystalline medium is controlled using an applied electric field and wherein the liquid-crystalline medium adopts at least two different states depending on the applied driving voltage.

A method for electrically driving a switchable optical element is provided. The switchable optical element comprises at least one switching layer, wherein the switching layer comprises a liquid-crystalline medium having at least three states, the state of the liquid-crystalline medium being controlled by an applied electric field, wherein the switching layer adopts a clear state when the driving voltage exceeds a first level, wherein when the voltage is lowered, the clear stage is held until the driving voltage falls below a second level, wherein the switching layer adopts a scattering state when the driving voltage is further reduced and falls below a third level, and wherein the switching layer adopts a third state when the driving voltage is further reduced and falls below a fourth level. The provided method comprises at least one of a) switching from the scattering state or the third state to the clear state by raising the driving voltage to a first clear voltage $V_{c1}$ which is equal to or higher than the first level and maintaining the driving voltage at the first clear voltage $V_{c1}$ for a first period of time $t_1$ and then lowering the driving voltage to a second clear voltage $V_{c2}$, which is lower than the first level and higher than the second level and the driving voltage being maintained at the second clear voltage $V_{c2}$ until the state is switched again, b) switching from the clear state to the scattering state by lowering the driving voltage from the second clear voltage $V_{c2}$ to a low voltage $V_L$ for a second period of time $t_2$ and then raising the driving voltage to a privacy voltage $V_p$, the privacy voltage $V_p$ being lower than or equal to the third level and higher than the fourth level and the low voltage $V_L$ being lower than the privacy voltage $V_p$, c) holding the scattering state by alternating the driving voltage between a privacy voltage $V_p$ and a low voltage $V_L$ until the state is switched again, wherein the privacy voltage $V_p$ is maintained for a fourth period of time $t_4$ and the low voltage $V_L$ is maintained for a fifth period of time $t_5$ and wherein the privacy voltage $V_p$ is lower than or equal to the third level and higher than the fourth level and the low voltage $V_L$ is lower than the privacy voltage $V_p$.

The switchable optical element which is controlled using the proposed method comprises at least one switching layer embedded in a multilayer structure. Preferably, the switching layer is positioned between two control layers, each control layer comprising a preferably transparent electrode. Preferably, an AC driving voltage is applied between the two transparent electrodes of the control layers.

The control layers may comprise a transparent substrate which is coated with a transparent electrode. Preferably, the control layer comprises additionally an alignment film which is arranged on one side of the coated substrate. The alignment film is preferably arranged on the side coated with the transparent electrode. The alignment film may be rubbed in an alignment direction.

The two control layers and the liquid-crystalline medium are arranged as a cell wherein the liquid-crystalline medium is placed in the gap formed by the two control layers. The size of the gap is preferably from 1 μm to 300 μm, preferably from 3 to 100 μm and more preferably from 5 to 100 μm, and most preferably from 10 to 50 μm.

The switching layer comprises a liquid-crystalline medium. A liquid-crystalline medium is defined as a substance having the properties of a liquid crystal. Typical liquid-crystalline media comprise at least one composition having elongated rod-shaped molecules. The liquid-crystalline media used in conjunction with the present invention have at least three states. The state of the liquid-crystalline medium is controlled using an electric field which is generated by the driving voltage applied between the two control layers. When no electric field is applied, the liquid-crystalline medium relaxes and, after relaxation is complete, is preferably in a planar cholesteric state. The voltage of the driving voltage and the voltages corresponding to the first level, the second level, the third level and the fourth level are in the following given as root mean square (RMS) voltage.

When the switching layer is exposed to an electric field by applying a driving voltage, the alignment of the liquid-crystal molecules is changed. When the applied voltage is above the first level, the liquid-crystalline medium preferably adopts a homeotropic state. When the applied voltage is lowered below a second level, the homeotropic state is lost and the liquid-crystalline medium may adopt a mixed state or a transition state.

When the applied voltage is lowered below a third voltage, the liquid-crystalline medium preferably adopts a multidomain state. When the voltage is further lowered below a fourth level or set to zero, so that no electric field is applied, the liquid crystalline medium preferably relaxes back into a planar cholesteric state. The voltages of the first and second level differ due to hysteresis of the liquid crystalline medium.

The liquid-crystalline medium is preferably in the homeotropic state when the switchable layer is in the clear state and the liquid-crystalline medium is preferably in the multidomain state when the switchable layer is in the scattering state.

If a liquid crystalline medium is used which is capable of switching immediately from the homeotropic into the multidomain state, no transition or mixed state is used. In this case, the second level and the third level may be equal.

In the homeotropic state (clear state) the rod-shaped liquid crystalline molecules align perpendicularly to the plane of the switching layer.

In the planar cholesteric (planar chiral nematic) state (third state) the liquid crystalline molecules align parallel to the plane of the switching layer and they experience a longer-range chiral order in the direction perpendicular to the plane of the switching layer.

In the multidomain state (scattering state) the liquid crystalline molecules align parallel to the plane of the switching layer wherein the molecules do not have a common axis of orientation and no common helical axis. Instead, multiple domains with molecules sharing the same axis orientation occur. For each domain the light propagation properties vary. As a result, light being transmitted through the switching layer is scattered. Light is thus transmitted diffusely and the switching element appears hazy.

Haze (diffusive transmission) is caused by scattering of light occurring when light is passed through a material. The haze H and the clarity C are measured using a BYK haze-gard i instrument from BYK Gardner. The measurement and calculation is performed according to the norm ASTM D 1003-00.

In the multidomain state of the liquid crystalline medium, the switching layer appears hazy and has a haze H of at least 20%, preferably of at least 30%, especially preferred of at least 35% and most preferred of at least 40%. The clarity in the multidomain state is preferably less than 80%, more preferred less than 60% and most preferred less than 40%. The multidomain state is also referred to as privacy state of the switchable optical element.

In the homeotropic state of the liquid crystalline medium the switching layer is transparent and appears clear and has a haze H of less than 5%, preferably of less than 3%. The clarity C in the homeotropic state is preferably at least 80%, more preferred at least 90% and most preferred at least 95%. The homeotropic state is also referred to as clear state of the switchable optical element.

The first level may be defined by the voltage level at which a haze H of less than 5% is first observed when the driving voltage is raised from zero voltage.

The second level may be defined by the voltage level at which a haze H exceeding or equal to 5% is first observed when the driving voltage is lowered from the first level.

The third level may be defined by the voltage level at which the haze H first exceeds 20% when the driving voltage is lowered from the second level.

The fourth level, which marks the transition from the scattering state to the third state, is preferably defined by the voltage level below which the liquid crystal will relax to a state resulting in a reduction of the haze. The relaxation of the liquid crystal and thus the reduction in haze may increase over time if the voltage level is maintained at a level below the fourth level. The fourth level is preferably defined as the voltage level at which a haze is observed which is at least 10% less than the maximum haze in the scattering state (privacy state), when the driving voltage is lowered starting from the third level.

Thus, the third state is defined by a haze of 90% or less of the maximum haze of the scattering state Preferably, for finding the respective voltage level the driving voltage is raised/lowered in small steps and the liquid crystal is given time for relaxation and for reaching a steady state after each change of the driving voltage. After the steady state has been reached, the haze H and/or clarity C is/are measured.

For switching the optical element into the homeotropic or clear state according to step (a) of the proposed method, the applied driving voltage is first raised to the first clear voltage $V_{c1}$ which is equal to or higher than the first level. The driving voltage is then maintained at the first clear voltage $V_{c1}$ for a first period of time $t_1$. After the first period of time $t_1$ has elapsed, the driving voltage is lowered to the second clear voltage $V_{c2}$, which is lower than the first level and higher than the second level. The driving voltage is maintained at the second clear voltage $V_{c2}$ until the state of the optical element is to be switched into the privacy state.

The proposed driving method only applies the strong electric field which is required to align the liquid-crystal molecules into the homeotropic state long enough to complete the transition into the clear state. Once the switching layer has adopted the clear state, a weaker electric field is sufficient to hold the liquid-crystal molecules in the homeotropic state. For applying the lower second clear voltage $V_{c2}$ less electrical power is required compared to applying the higher first clear voltage $V_{c1}$. Thus, the inventive method advantageously reduces the amount of power required to maintain the switchable optical element in the clear state.

Preferably the second clear voltage $V_{C2}$ is chosen by determining the second level and adding a safety margin to the determined second level voltage.

The first period of time $t_1$ is preferably selected from 1 ms to 60 s.

For switching the optical element from the homeotropic or clear state to the multidomain state the driving voltage is lowered from the second clear voltage $V_{c2}$ to the low voltage $V_L$. The low voltage $V_L$ is lower than the privacy voltage $V_p$ and may be lower than the fourth level. Preferably, the low voltage $V_L$ is set to a voltage in the range of from 0 to 1 V wherein 0 V is most preferred. Preferably, the low voltage $V_L$ is maintained for a second period of time $t_2$ and the driving voltage is then raised to the privacy voltage $V_p$. The privacy voltage $V_p$ is lower than or equal to the third level and higher than the fourth level. Preferably, the privacy voltage $V_p$ is in the range of from 0 V to 10 V, more preferably in the range of from 3 V to 6 V.

By applying the low voltage $V_L$ the electric field is also lowered which allows the liquid-crystalline medium to relax. The applied voltage is raised again after the time period $t_2$ has expired. Preferably, after the time period $t_2$ has elapsed, the liquid crystal media has not yet relaxed into the planar cholesteric state and is still in the multidomain state.

Preferably, the lowering of the driving voltage from $V_{C2}$ to the low voltage $V_L$ is done gradually during the second period of time $t_2$. It has been found that a gradual, slow transition from the second clear voltage $V_{c2}$ to the low voltage $V_L$ results in a more homogeneous distribution of the domains in the multidomain state than the distribution obtained for a change of applied voltage in a single step. As a result, the appearance of the switchable optical element in the privacy state is also more homogeneous.

The second period of time $t_2$ is preferably selected from the range of from 1 ms to 3 s. More preferably, $t_2$ is selected from the range of from 1 s to 2 s.

Preferably the raising of the driving voltage from $V_L$ to $V_p$ is done gradually during a third period of time $t_3$.

The third period of time $t_3$ is preferably selected from the range of from 1 ms to 60 s. More preferably, $t_3$ is selected from the range of from 1 ms to 3 s.

After the switching layer has adopted the scattering (privacy) state, the applied voltage is preferably maintained at the privacy voltage $V_p$ until the optical element is switched again.

Alternatively, according to step c) of the method, the applied voltage is alternated between the privacy voltage $V_p$ and the low voltage $V_L$ after the switching layer has adopted the scattering state, wherein the driving voltage is respectively maintained at the privacy voltage $V_p$ for a fourth period of time $t_4$ and at low voltage for a fifth period of time $t_5$. When the voltage is set to the low voltage $V_L$, the liquid-crystalline medium slowly relaxes back into the third state (planar cholesteric state). This process is reversed when the voltage is set again to the privacy voltage $V_p$. By alternating the applied driving voltage between the low voltage $V_L$ and the privacy voltage $V_p$ the energy consumption is decreased as the electric field is only applied in full strength for a fraction of the total time. Further, the gradual growth of the domains for a constant applied voltage is avoided. Thus, the privacy state is stable.

The fourth period of time $t_4$ is preferably selected from 1 to 60 s. The fifths period of time $t_5$ is preferably selected from 1 to 60 s.

The applied voltage is preferably an AC voltage, more preferably an AC voltage having a square waveform or a sine waveform. Preferably the frequency of the AC voltage is selected in the range of from 0.1 to 1000 Hz, more preferably in the range of from 40 to 80 Hz.

The switchable optical element is preferably a window element which can be switched from a transparent clear state to a hazy privacy state.

Preferably, in at least one state of the device, the liquid-crystalline medium is in a phase having nematically oriented molecules.

The liquid crystalline medium may further comprise a polymer fraction.

Preferably, the polymer fraction comprises a polymeric network obtained by polymerization of reactive mesogens.

Preferably, the liquid-crystalline medium comprises a chiral dopant, wherein the amount of the chiral dopant in the liquid-crystalline medium is from 0.1% by weight to 30% by weight, more preferably from 0.1% by weight to 10% by weight.

The scattering state of the liquid-crystalline medium preferably occurs at an applied voltage which is smaller than the voltage at which the clear state occurs. In particular, the applied voltage for achieving the scattering switching state is significantly greater than zero, preferably 2 to 10 V, particularly preferably 3 to 7 volts. The applied voltage for achieving the clear state is preferably between 10 and 60 V, particularly preferably between 15 and 50 V, most preferably between 15 and 30 V.

The molecules of the liquid-crystalline medium are preferably in a chirally nematic phase if the switching layer is in the switching state where H>20%, i.e. in the scattering state.

In a further preferred embodiment, the chirally nematic phase in the scattering state in which H is >20% is a phase aligned in polydomains (multidomain state). For the purposes of the present invention, "a phase aligned in polydomains" means a state in which the molecules of the liquid-crystalline medium do not have a uniform orientation axis and do not have a uniform common linear helical axis. The phase aligned in polydomains in the switching layer has the advantage that it is homogeneous, and is preferably free from visible defects over the entire area. In particular, this is an advantage over phases in which helices occur which are uniformly parallel to the substrate layers, and/or over phases which have so-called strip domains. A further advantage of the phase aligned in polydomains is that it can be achieved with the conventional alignment layers (alignment film) oriented in a planar or homeotropic manner, i.e. that there is no need to fall back on special additional treatments of the alignment layers.

In a further preferred embodiment, the chirally nematic phase in one switching state is at least locally twisted, alternatively also in superordinate macroscopic structure arrangements which can be formed therefrom.

In a further preferred embodiment, the phase in the other switching state is untwisted, i.e. aligned in a homeotropic or planar manner, or it has a low degree of twist. A low degree of twist here is taken to mean a twist of the molecules over the thickness of the layer of 5°-360°, preferably 45°-300°, and particularly preferably 90°, 180° or 270°.

The chiral dopant is preferably homogeneously distributed in the nematic phase, so that the molecules of the liquid-crystalline medium and the chiral dopant are homogeneously distributed in one another.

The chiral dopant is particularly preferably dissolved in the nematic phase.

The chirally nematic phase is preferably employed in the form of a nematic liquid-crystalline mixture, where the mixture has a refractive index anisotropy Δn and a dielectric anisotropy Δε. Preferably, the mixture has a positive dielectric anisotropy Δε. The mixture preferably has a refractive index anisotropy Δn in the range from 0.03 to 0.40, particularly preferably in the range from 0.07 to 0.30, and/or a dielectric anisotropy Δε in the range from −50 to +100, particularly preferably in the range from −15 to +70. Furthermore, the preferred values indicated above for the dielectric anisotropy Δε apply in this respect.

The liquid-crystalline mixture preferably comprises at least one compound of a component I, at least one compound of a component II, and at least one compound of a component III.

Compounds of component I are selected from bicyclic compounds which contain at least one end group selected from F, CN, alkyl groups having 1 to 10 C atoms, alkenyl groups having 2 to 10 C atoms and alkoxy groups having 1 to 10 C atoms.

Compounds of component II are selected from tricyclic compounds which contain at least one end group selected from F, CN, alkyl groups having 1 to 10 C atoms, alkenyl groups having 2 to 10 C atoms and alkoxy groups having 1 to 10 C atoms.

Compounds of component III are selected from tetracyclic compounds which contain at least one end group selected from F, CN, alkyl groups having 1 to 10 C atoms, alkenyl groups having 2 to 10 C atoms and alkoxy groups having 1 to 10 C atoms.

The proportion of the compounds of components I, II and III in the liquid-crystalline medium together is preferably at least 70% by weight, preferably at least 80% by weight, and particularly preferably at least 85% by weight.

A mixture of liquid-crystalline molecules which is preferably employed is the mixture, referred to as liquid crystalline medium #1 (LCM-1), of the molecules depicted below:

PZG-3-N

PZG-2-N

PZG-4-N

-continued

PZG-5-N

CP-3-N

PPTUI-3-2

PPTUI-3-4

CGPC-3-3

The composition of liquid crystalline medium LCM-1 is given in table 1.

TABLE 1

| Component | Proportion (weight %) |
|---|---|
| PZG-2-N | 9 |
| PZG-3-N | 10 |
| PZG-4-N | 14 |
| PZG-5-N | 14 |
| CP-3-N | 2 |
| PPTUI-3-2 | 20 |
| PPTUI-3-4 | 28 |
| CGPC-3-3 | 3 |

A further mixture of liquid-crystalline molecules which is preferably employed is the mixture, referred to as liquid crystalline medium #2 (LCM-2), of the molecules depicted below:

CP-3-N

CP-5-N

The composition of liquid crystalline medium LCM-2 is given in table 2.

TABLE 2

| Component | Proportion (weight %) |
|---|---|
| CP-3-N | 16 |
| CP-5-N | 16 |
| CPG-3-F | 5 |
| CPG-5-F | 5 |
| CPU-3-F | 15 |
| CPU-5-F | 15 |
| CCGU-3-F | 7 |
| CGPC-3-3 | 4 |
| CGPC-5-3 | 4 |
| CGPC-5-5 | 4 |
| CCZPC-3-3 | 3 |
| CCZPC-3-4 | 3 |
| CCZPC-3-5 | 3 |

The chiral dopant used is preferably one of the molecules depicted below, where particular preference is given to the chiral dopants S-5011 or S-811 shown below:

-continued

The switching layer preferably has an average refractive index n, and the molecules have a pitch p, where the product n·p is >0.8 µm, particularly preferably >1.0 µm, very particularly preferably >1.2 µm and is particularly preferably in the range from 50 µm to 0.8 µm, and is very particularly preferably in the range from 25 µm to 0.8 µm.

It is furthermore preferred for the pitch p to be between 0.5 µm and 50 µm, particularly preferably between 0.5 µm and 30 µm, and very particularly preferably between 0.5 µm and 15 µm. p is most preferably between 1 µm and 5 µm. It has been found that low switching voltages can thus be achieved. Low switching voltages are advantageous for switchable windows, inter alia for safety reasons.

The value p can be adjusted by the person skilled in the art through a suitable choice of the chiral dopant and its helical twisting power β and through its concentration.

In a further preferred embodiment of the switching layer which comprises a liquid-crystalline medium having a chiral dopant, use is preferably made of a chiral dopant which has a helical twisting power $\beta=(p\cdot c)^{-1}$ µm$^{-1}$, where p is the pitch of the molecules of the liquid-crystalline medium in µm and c is the concentration of the chiral dopant in % by weight, based on the entire liquid-crystalline medium, and where β is greater than 5 µm$^{-1}$. The chiral dopant preferably has a helical twisting power which is between 5 and 250 µm$^{-1}$, particularly preferably between 7 and 150 µm$^{-1}$.

It is furthermore preferred that the value d/p is >2, where d is the thickness of the switching layer, and p is the pitch of the molecules of the liquid-crystalline medium. d/p is particularly preferably <20. d/p very particularly preferably has a value between 3 and 10. Suitable values of d/p enable, in particular, highly scattering switching layers to be obtained, i.e. switching layers having high haze values.

In general, the liquid-crystalline medium preferably has a clearing point of >90° C., more preferably >100° C. or >105° C. and very particularly preferably >110° C.

Furthermore, the liquid-crystalline medium of the switching layer generally preferably has a specific resistance of >1.0.10$^9$ ohm·cm, particularly preferably >1.0.10$^{11}$ ohm·cm.

BRIEF DESCRIPTION OF THE DRAWINGS

The drawings show.

Figure 1:
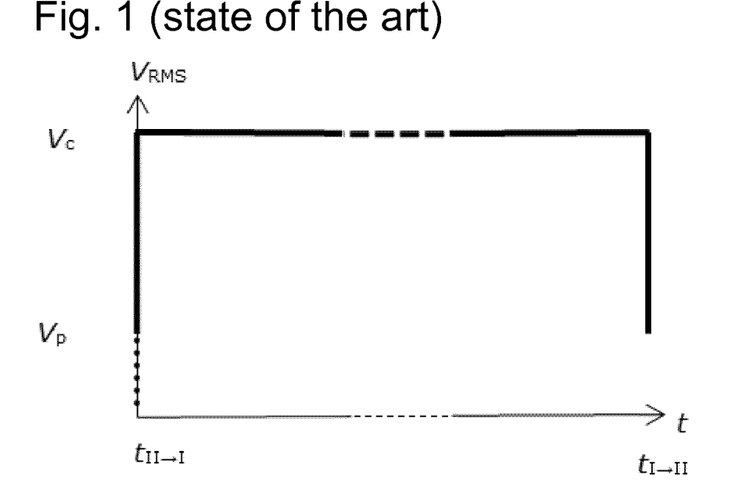
FIG. 1 driving method for switching an optical element to the clear state according to the state of the art, FIG. 2 driving method for switching an optical element to the privacy state according to the state of the art, FIG. 3 a first embodiment of a driving method for switching an optical element to the clear state and later to the privacy state, FIG. 4 a second embodiment of a driving method for switching an optical element to the privacy state, FIG. 5 a diagram showing at which voltage levels switching of states of the optical element occurs, FIG. 6 the preparation of control layers for a switchable optical element, FIG. 7 a schematic view of a switchable optical element, FIG. 8 a microscope image of the clear state, FIG. 9 a microscope image of the privacy state at a first time, FIG. 10 a microscope image of the privacy state at a second time and FIG. 11 a microscope image of the privacy state at a third time.

In FIG. 1 the driving scheme for switching a switchable optical element to the clear state according to the state of the art is plotted. The plot shows the root mean square value (RMS) of the AC driving voltage versus time.

For switching of the switchable optical element from the privacy state II to the clear state I, the driving voltage is raised to a clear voltage $V_c$. As long as the clear state is to be maintained the driving voltage is held at the constant level $V_c$.

Figure 2:
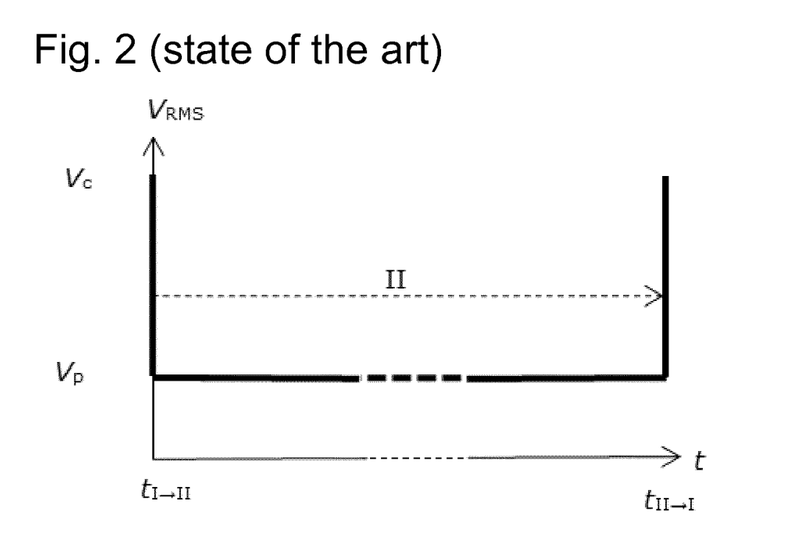

In FIG. 2 the driving scheme for switching a switchable optical element to the privacy state according to the state of the art is plotted. The plot shows the root mean square value (RMS) of the AC driving voltage versus time.

For switching of the switchable optical element from the clear state I to the privacy state II, the driving voltage is lowered to a privacy voltage $V_p$. As long as the privacy state is to be maintained the driving voltage is held at the constant level $V_p$.

Figure 3:
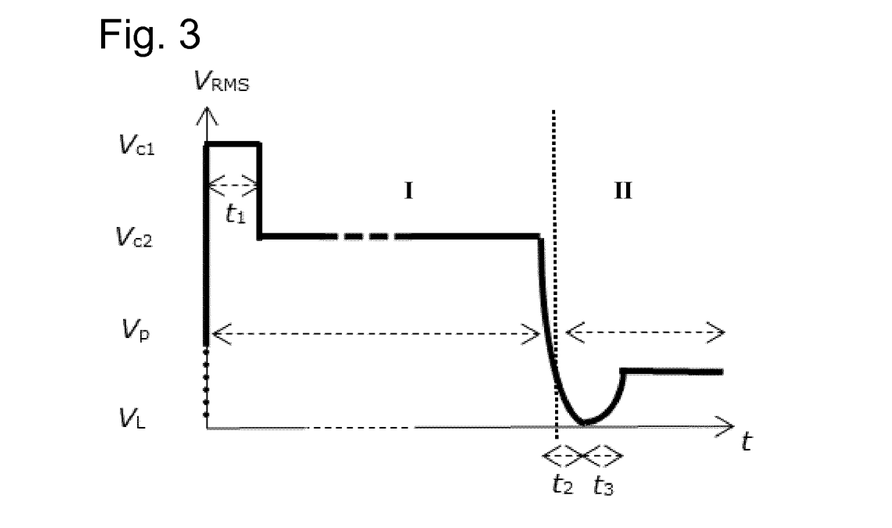

FIG. 3 depicts a first embodiment of the proposed driving scheme. In the plot of FIG. 3 the RMS value of the AC driving voltage is plotted versus time t.

For switching of the switchable optical element from the privacy state II to the clear state I, the driving voltage is first raised to a first clear voltage $V_{c1}$. This applied voltage is maintained for a first period of time $t_1$. After lapsing of the first time period $t_1$, the driving voltage is lowered to a second clear voltage $V_{c2}$. As long as the clear state is to be maintained the driving voltage is held at the constant level $V_{c2}$.

For switching of the switchable optical element from the clear state I to the privacy state II, the driving voltage is first lowered to a low voltage $V_L$ which is preferably set to 0 V. The lowering is performed gradually over a second time period $t_2$. At the end of the time period $t_2$, the applied driving voltage is at the low Voltage $V_L$ and is from there raised again to the privacy voltage $V_p$. The raising of the driving voltage is also done gradually over a time period $t_3$. After the time period $t_3$ has expired, the driving voltage is maintained at the constant level $V_p$ until the next switch occurs.

Figure 4:
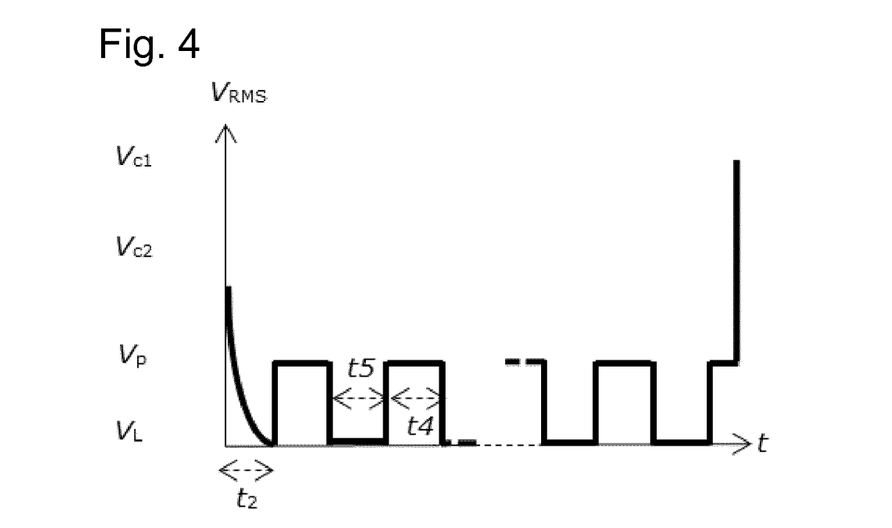

FIG. 4 depicts a further embodiment of the proposed driving scheme. In the plot of FIG. 4 the RMS value of the AC driving voltage is plotted versus time t.

For switching of the switchable optical element from the clear state I to the privacy state II, the driving voltage is first lowered to a low voltage $V_L$ which is preferably set to 0 V. The lowering is performed gradually over a second time period $t_2$. At the end of the time period $t_2$, the applied driving voltage is at the low voltage $V_L$ and is from there raised again in a single step to the privacy voltage $V_p$. The driving voltage is maintained at the privacy voltage $V_p$ for a fourth time period $t_4$. After the time period $t_4$ has expired, the driving voltage is lowered to the low voltage $V_L$ in a single step. The low voltage is maintained for the fifth time period $t_5$. After the fifth time period has expired the driving voltage is again raised to the privacy voltage $V_p$. The driving voltage is alternated between the privacy voltage $V_p$ and the low voltage $V_L$ in the described manner until the next switch to the clear state occurs.

Figure 5:
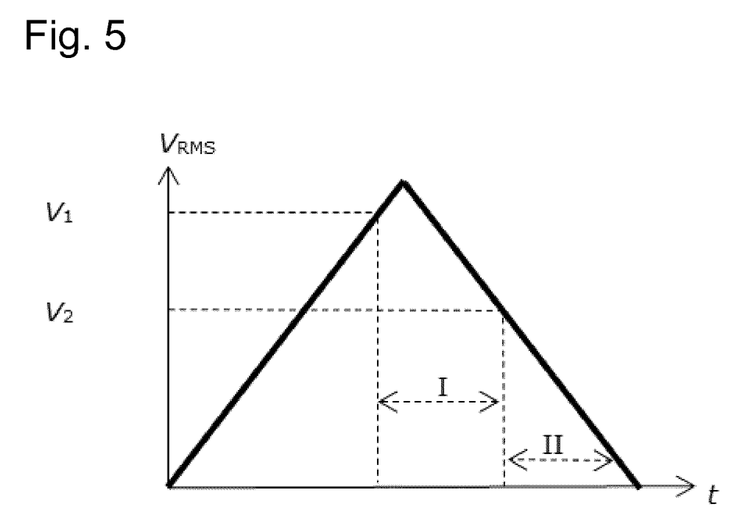

FIG. 5 shows a plot of the driving voltage versus time in which the driving voltage is raised linearly to a maximum voltage and then lowered again.

When the driving voltage is raised, the switchable optical element adopts the clear state when the driving voltage exceeds the first level. The voltage corresponding to the first level is marked with V1 in FIG. 5. When the driving voltage is subsequently lowered, the relaxation back to the scattering (privacy) state does not occur at the same level. The optical element remains in the clear state until the driving voltage is lowered below the second level marked with V2 in FIG. 5. This hysteresis is used to define the first clear voltage level and the second clear voltage level. The first clear voltage $V_{c1}$ is chosen equal to or slightly above the voltage marked with V1 and the second clear voltage $V_{c2}$ is chosen equal to or slightly above the voltage marked with V2 in FIG. 5. The first and second clear voltages are preferably chosen slightly higher than the respective V1 and V2 voltages by adding a safety margin to ensure that the first clear voltage is always high enough to safely switch the optical element into the clear state and that the second clear voltage is high enough to safely maintain the clear state.

Figure 6:
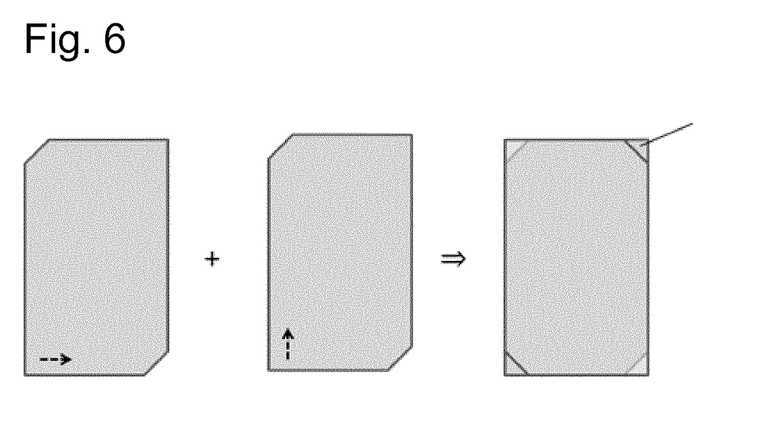

FIG. 6 shows the preparation of control layers for a switchable optical element. Two glass substrates are cut to the shapes depicted in FIG. 6 by removing two diagonally opposite corners of the rectangular substrate. The glass substrates are coated with an indium-tin-oxide (ITO) transparent electrode. Additionally, an alignment layer is arranged on the ITO electrodes. When arranged in a cell wherein the two glass substrates form a gap for receiving the liquid-crystalline medium, the alignment layers provide a preferred direction for the alignment of the liquid-crystal molecules. In the embodiment of FIG. 6, the alignment layers of the two glass substrates are arranged at a respective angle of the rubbing directions of 90°. Alternative angles, such as 30°, 40°, 50°, 60°, 70° and 80°, and 100°, 110°, 120°, 130°, 140° and 150° are also possible.

For each of the two glass substrates, two corners have been cut away. When the two glass substrates are arranged in the cell configuration, the ITO electrodes are facing towards the inside of the formed gap. The cut corners expose parts of the electrodes and thus allow the electrodes to be electrically contacted.

Figure 7:
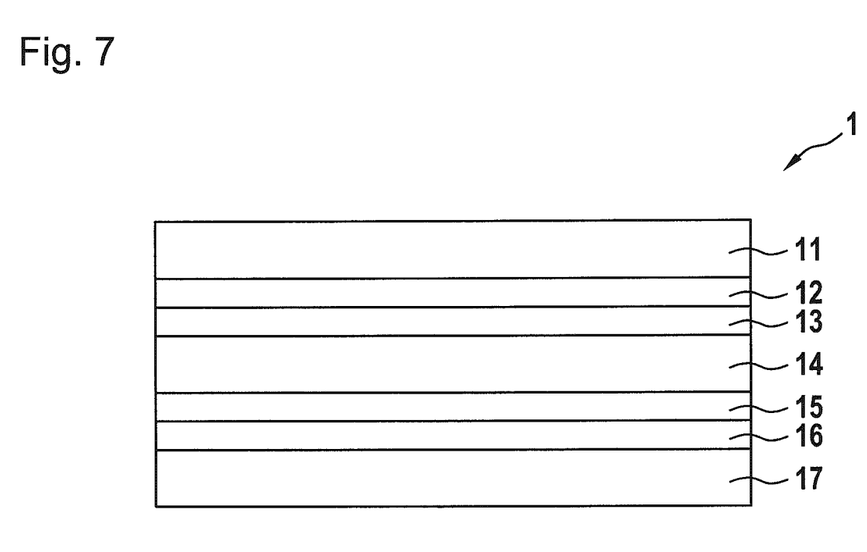

FIG. 7 shows a schematic view of a switchable optical element 1. The switchable optical element 1 comprises in this order a first glass substrate 11, a first transparent electrode 12, a first alignment layer 13, a switching layer 14, a second alignment layer 15, a second transparent electrode 16 and a second glass substrate 17.

The switching layer 14 comprises the liquid-crystalline medium. The state of the liquid-crystalline medium is controlled by an electric field which is generated by a driving voltage applied between the first transparent electrode 12 and the second transparent electrode 16.

Figure 8:
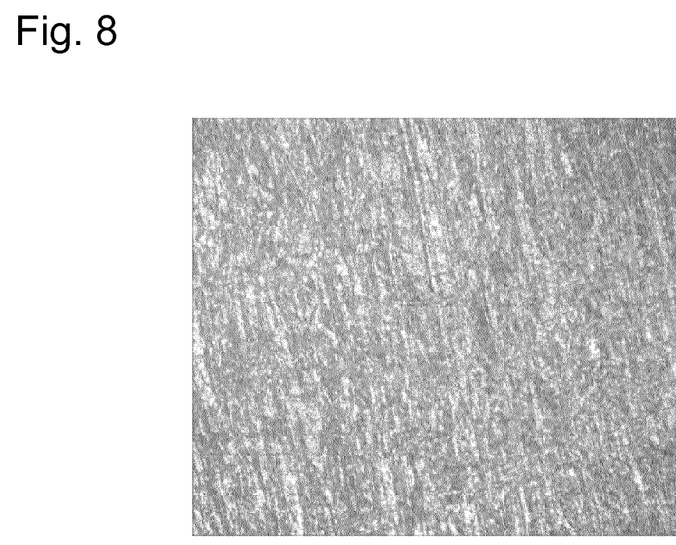

FIG. 8 shows a microscope image of the clear state. The structures seen in the microscope image are the structures and imperfections of the glass surface of the substrates. No structures of the switching layer are visible.

Figure 9:
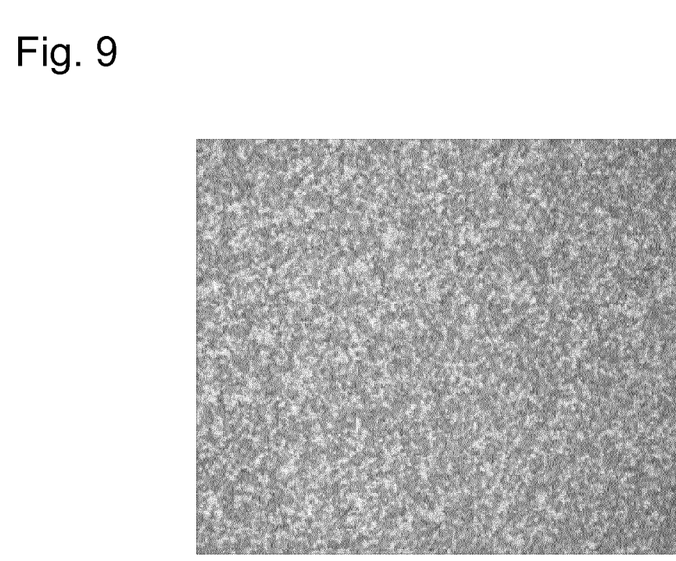

FIG. 9 shows a microscope image of the privacy state at a first time. The image depicts the privacy state right after the switching has occurred with the driving voltage first set to the privacy voltage $V_p$. The image shows an homogenous distribution of the domains.

Figure 10:
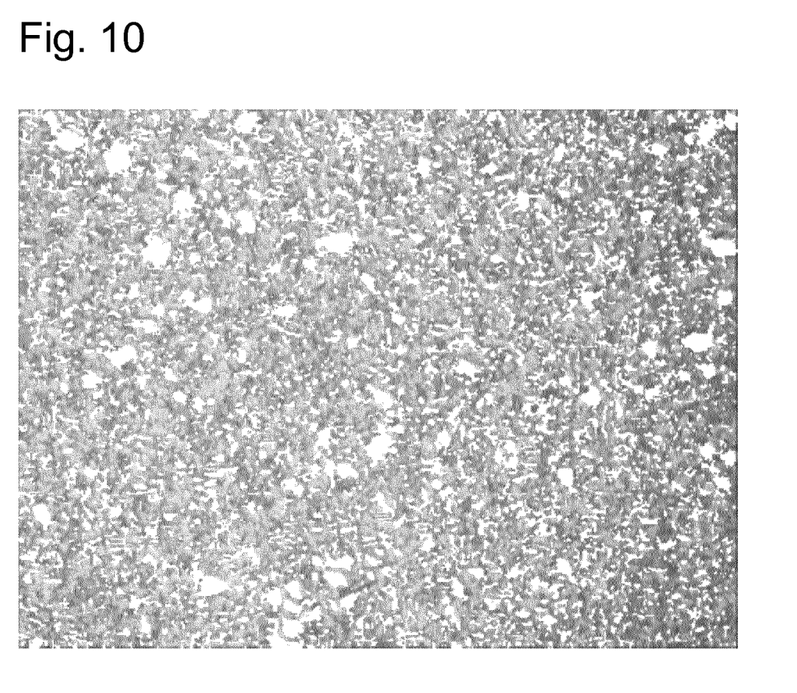

FIG. 10 shows a microscope image of the privacy state at a second time. The image depicts the privacy state at the end of the fifth time period $t_5$ according to the driving method shown in FIG. 4. Some areas have relaxed back into the planar cholesteric state but most of the domains are still of a small size so that the privacy state of the optical element is still maintained at the depicted time.

Figure 11:
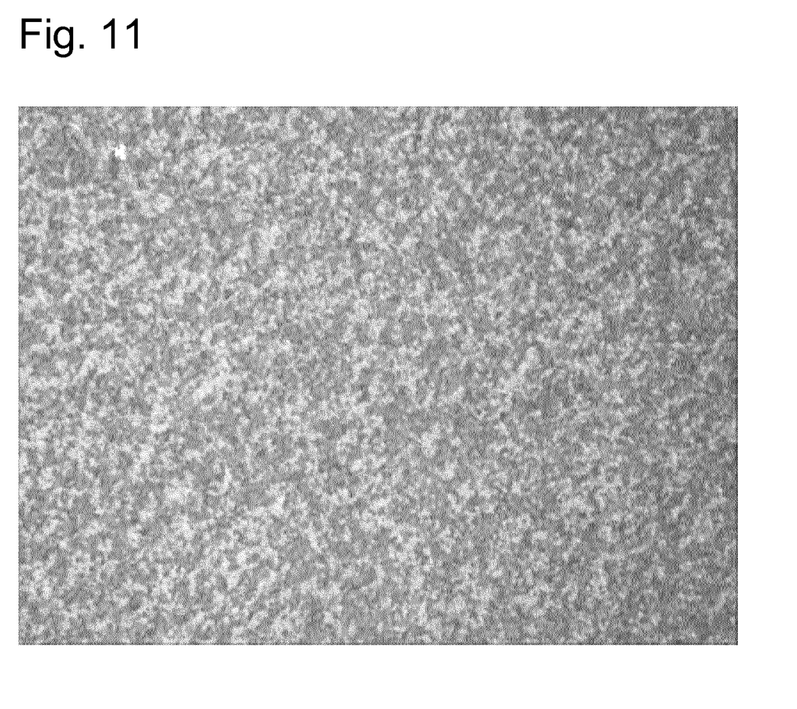

FIG. 11 shows a microscope image of the privacy state at a third time. The image depicts the privacy state at the end of the fourth time period $t_4$ according to the driving method shown in FIG. 4. The image shows again a homogenous distribution of the domains of the multidomain state.

EXAMPLES

Example 1

Two sheets of conductive ITO (indium-tin-oxide) coated glass are obtained. The sheets are cut and ground in the shapes depicted in FIG. 6.

After washing the substrates, a polyimide alignment layer is printed on their coated side. The substrates are baked in an oven and the polyimide is rubbed to obtain alignment layers with a mutual rotation of 90°. Subsequently, the substrates are arranged as a cell with a 25 μm cell gap (alignment layers facing inside). When combined into a cell, the cut corner of one substrate is facing the non-cut corner of the other substrate, resulting in four areas where electrical contact can be established.

A mixture is prepared consisting of the nematic liquid crystalline medium LCM-1 (see Table 1 for composition) and 1.2 wt % of the chiral dopant R-5011. Subsequently, the cell is filled with the liquid crystal/chiral dopant mixture using vacuum filling, pressed and placed into an oven for a final curing step. To obtain the switchable window, the liquid crystal cell is combined with a glass sheet into an insulated glass unit. Electrical wiring is attached onto the contact areas by soldering.

An AC power source with a 60 Hz frequency and a square waveform with controllable voltage is prepared and connected to the switchable window.

To obtain the clear state, an RMS (root-mean-square) voltage of 57 V is applied for ~10 seconds. Subsequently, the voltage is lowered to 45 V, still holding the clear state. The haze H is measured to be 0.5% and the clarity C is measured to be 99.8% (measurements are done using a BYK haze-gard i instrument, which uses the norm ASTM D 1003-00).

To obtain the privacy state, the voltage is reduced from 45 V to 4 V by gradually reducing the voltage over 3 seconds. The haze H is measured to be 85% and the clarity C is measured to be 29%.

Example 2

A glass cell with a 25 μm cell gap is produced similar to example 1. However, this time no alignment layer is applied. A mixture is prepared consisting of the nematic liquid crystalline medium LCM-2 (see Table 2 for composition) and 2.1 wt % of the chiral dopant S-811. Subsequently, the cell is filled with the liquid crystal/chiral dopant mixture.

Electrical wiring is attached by soldering and the cell is connected to a variable voltage source.

The cell is switched to a scattering state by lowering the voltage from 25 V to 5 V. The microscope image shown in FIG. 9 depicts the observed multidomain state.

When the cell is switched from 25 V to 0 V, and subsequently kept at 0 V, gradually growing planar domains could be observed as can be seen in the microscope images shown in FIG. 10. This results in a gradual loss of privacy.

The cell is switched from 25 V to 5 V, then to 0 V, and after 30 seconds back to 5 V. After the switch from 25 to 5 V a multidomain state is obtained. At 0 V, planar domains start to grow gradually. The cell is then switched back to 5 V for 30 seconds. After these 30 seconds, a complete multidomain state is again obtained (see FIG. 11). This pattern of varying between 0 V and 5 V is continued, thereby maintaining a scattering window.

The invention claimed is:

1. A method for electrically driving a switchable optical element comprising at least one switching layer, wherein the switchable optical element is a window element, wherein the switching layer comprises a liquid-crystalline medium having at least three states, the state of the liquid-crystalline medium being controlled by an applied electric field, wherein the switching layer adopts a clear state when the driving voltage exceeds a first level, wherein when the voltage is lowered from the first level, the clear stage is held until the driving voltage falls below a second level, wherein the second level is lower than the first level, wherein the switching layer adopts a scattering state when the driving voltage is further reduced and falls below a third level, and wherein the switching layer adopts a third state when the driving voltage is further reduced and falls below a fourth level, the method comprising:
    (a) switching from the clear state to the scattering state by lowering the driving voltage from a second clear voltage $V_{c2}$ which is lower than the first level and higher than the second level to a low voltage $V_L$ for a period of time $t_2$ and then raising the driving voltage to a privacy voltage $V_p$, the privacy voltage $V_p$ being lower than or equal to the third level and higher than the fourth level and the low voltage $V_L$ being lower than the privacy voltage $V_p$, and
    (b) holding the scattering state by alternating the driving voltage between the privacy voltage $V_p$ and the low voltage $V_L$ until the state is switched again, wherein the privacy voltage $V_p$ is maintained for a period of time $t_4$ and the low voltage $V_L$ is maintained for a period of time $t_5$.

2. The method according to claim 1, further comprising: switching from the scattering state or the third state to the clear state by raising the driving voltage to a clear voltage Vc1 which is equal to or higher than the first level and maintaining the driving voltage at the clear voltage Vc1 for a period of time t 1 and then lowering the driving voltage to the clear voltage Vc2 with the driving voltage being maintained at the second clear voltage Vc2 until the state is switched again.

3. The method according to claim 1, wherein the driving voltage is a square waveform having a frequency of from 0.1 to 1000 Hz.

4. The method according to claim 2, wherein the period of time $t_1$ is from 1 ms to 60 s.

5. The method according to claim 1, wherein the period of time $t_2$ is from 1 ms to 60 s.

6. The method according to claim 1, wherein the haze of the switching layer is less than 5% when the switching layer is in the clear state.

7. The method according to claim 1, wherein the switching layer has a haze of at least 20% when the switching layer is in the scattering state.

8. The method according to claim 1, wherein the transition from the scattering state to the third state is defined by a reduction of the haze from the maximum haze observed in the scattering state by at least 10%.

9. The method according to claim 1, wherein the liquid crystalline medium has at least a homeotropic state and a multidomain state and wherein the switching layer is in a clear state when the liquid crystalline medium is in the homeotropic state and is in the scattering state when the liquid crystalline medium is in the multidomain state.

10. The method according to claim 1, wherein the liquid-crystalline medium has a positive dielectric anisotropy $\Delta\varepsilon$.

11. The method according to claim 1, wherein the liquid-crystalline medium comprises a chiral dopant, and the amount of the chiral dopant in the liquid-crystalline medium is from 0.1% by weight to 30% by weight.

12. The method according to claim 1, wherein the liquid crystalline medium comprises a polymer fraction.

13. The method according to claim 1, wherein the switching layer has an average refractive index n, and the molecules of the liquid crystal medium have a pitch p, and the product np is in the range from 50 $\mu$m to 0.8 $\mu$m.

14. The method according to claim 1, wherein the molecules of the liquid crystal medium have a pitch p which is between 0.5 $\mu$m and 30 $\mu$m.

15. The method according to claim 1, wherein the switching layer has a thickness d and the molecules of the liquid crystal medium have a pitch p, and the d/p is between 3 and 10.

16. The method according to claim 1, wherein when the applied voltage is above the first level, the liquid-crystalline medium exhibits a homeotropic state, when the applied voltage is lowered below the second level the liquid-crystalline medium exhibits a mixed state or a transition state, when the applied voltage is lowered below the third voltage the liquid-crystalline medium exhibits a multidomain state, when the voltage is lowered below the fourth level, the liquid crystalline medium exhibits a planar cholesteric state.

17. The method according to claim 1, wherein
the first level is the voltage level when a haze H of less than 5% for the liquid-crystalline medium is first observed when the driving voltage is raised from zero voltage,
the second level is the voltage level when a haze H of equal to or greater than 5% for the liquid-crystalline medium is first observed when the driving voltage is lowered from the first level, and
the third level is the voltage level when a haze H of greater than 20% for the liquid-crystalline medium is first observed when the driving voltage is lowered from the second level.

* * * * *